(12) United States Patent
Kawashima

(10) Patent No.: US 8,332,774 B2
(45) Date of Patent: Dec. 11, 2012

(54) DISPLAY APPARATUS AND DISPLAY CONTROL PROGRAM

(75) Inventor: Tsuyoshi Kawashima, Nagoya (JP)

(73) Assignee: Brother Kogyo Kabushiki Kaisha, Aichen-Ken (JP)

( * ) Notice: Subject to any disclaimer, the term of this patent is extended or adjusted under 35 U.S.C. 154(b) by 1058 days.

(21) Appl. No.: 12/273,282

(22) Filed: Nov. 18, 2008

(65) Prior Publication Data
US 2009/0138816 A1    May 28, 2009

(30) Foreign Application Priority Data

Nov. 26, 2007    (JP) ................... 2007-305106

(51) Int. Cl.
*G06F 3/048* (2006.01)
(52) U.S. Cl. ........ 715/787; 715/786; 715/784; 715/783; 715/785
(58) Field of Classification Search .......... 715/786, 715/787
See application file for complete search history.

(56) References Cited

U.S. PATENT DOCUMENTS

| | | | | |
|---|---|---|---|---|
| 7,117,453 | B2 * | 10/2006 | Drucker et al. | 715/833 |
| 7,545,363 | B2 * | 6/2009 | Kaneko et al. | 345/158 |
| 7,581,186 | B2 * | 8/2009 | Dowdy et al. | 715/727 |
| 2002/0180879 | A1 | 12/2002 | Shiohara | |
| 2003/0098885 | A1 | 5/2003 | Yabe | |
| 2006/0181550 | A1 | 8/2006 | Nohara | |
| 2007/0061748 | A1 | 3/2007 | Hirose | |
| 2008/0126975 | A1 * | 5/2008 | Vassigh et al. | 715/772 |
| 2008/0215962 | A1 * | 9/2008 | Belitz et al. | 715/232 |

FOREIGN PATENT DOCUMENTS

| | | |
|---|---|---|
| JP | 2001-285947 | 10/2001 |
| JP | 2002-369123 | 12/2002 |
| JP | 2003-162356 | 6/2003 |

(Continued)

OTHER PUBLICATIONS

Japanese Office Action, with English translation, issued in Japanese Patent Application No. 2007-305106, mailed Dec. 8, 2009.

(Continued)

*Primary Examiner* — Omar Abdul-Ali
*Assistant Examiner* — Sherrod Keaton
(74) *Attorney, Agent, or Firm* — McDermott Will & Emery LLP

(57) ABSTRACT

A display apparatus is provided including a display panel; a user input switch for inputting a first switching instruction and a second switching instruction from the user; and a processor. The processor is configured to manage a display order of image data files and associated text data; select text data to be displayed, the text data corresponding to image data from a selected one of the image data files; and display the selected text data on the display panel responsive to the first switching instruction. The processor is also configured to continuously switch the displayed text data in the display order; judge whether the second switching instruction has been input by the user when the text data is being displayed; and shift the display to a display of 1) an image corresponding to the displayed text data, and 2) an image string representing a plurality of the image data files which follow the image corresponding to the displayed text data in the display order when the second switching instruction is input.

20 Claims, 11 Drawing Sheets

FOREIGN PATENT DOCUMENTS

| | | |
|---|---|---|
| JP | 2003-196317 | 7/2003 |
| JP | 2005-020209 | 1/2005 |
| JP | 2005-064930 | 3/2005 |
| JP | 2005-345917 | 12/2005 |
| JP | 2006-227297 | 8/2006 |
| JP | 2007-108805 | 4/2007 |

OTHER PUBLICATIONS

Japanese Office Action, with English translation, issued in Japanese Patent Application No. 2007-305106, mailed Mar. 30, 2010.

* cited by examiner

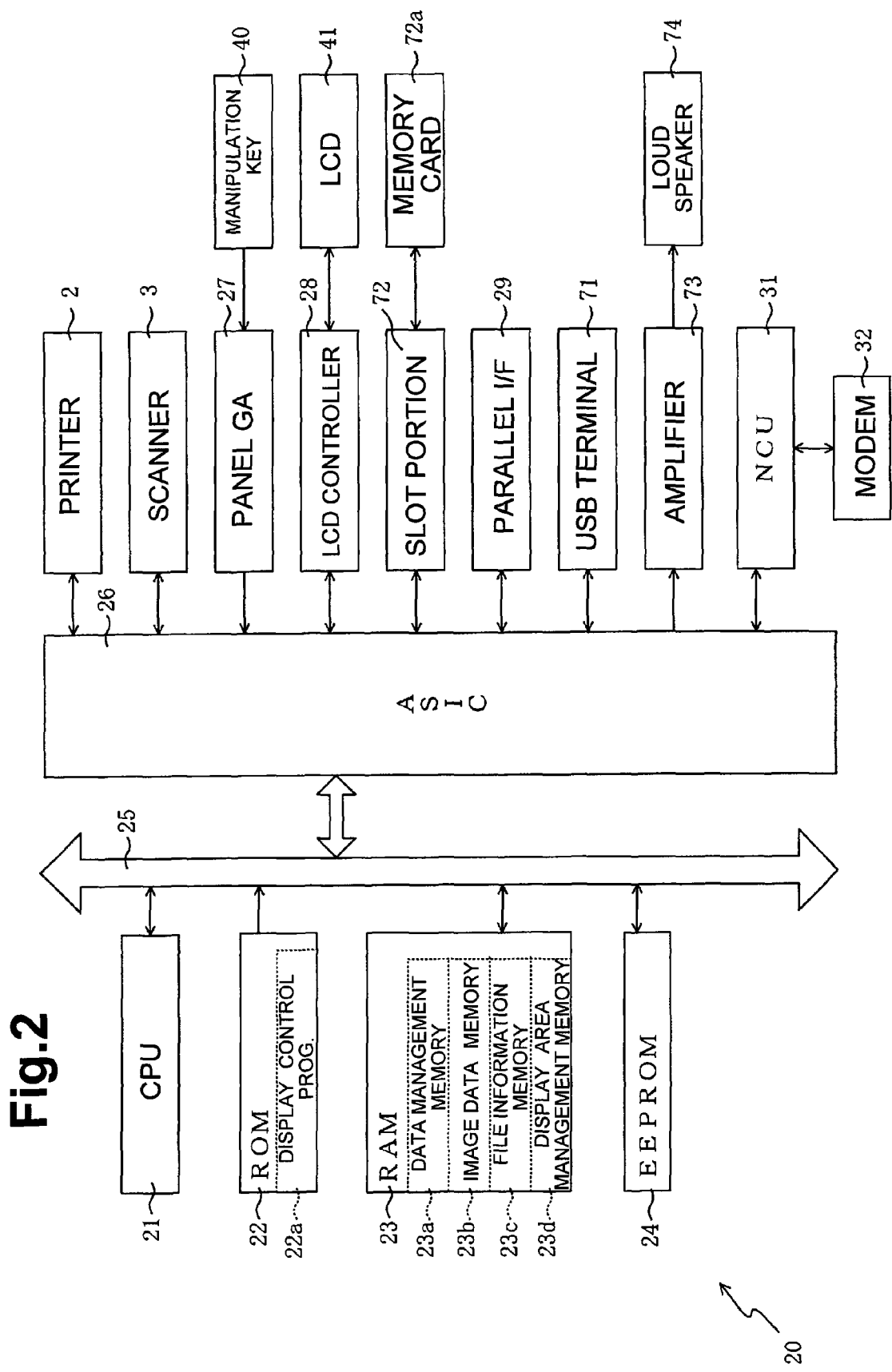

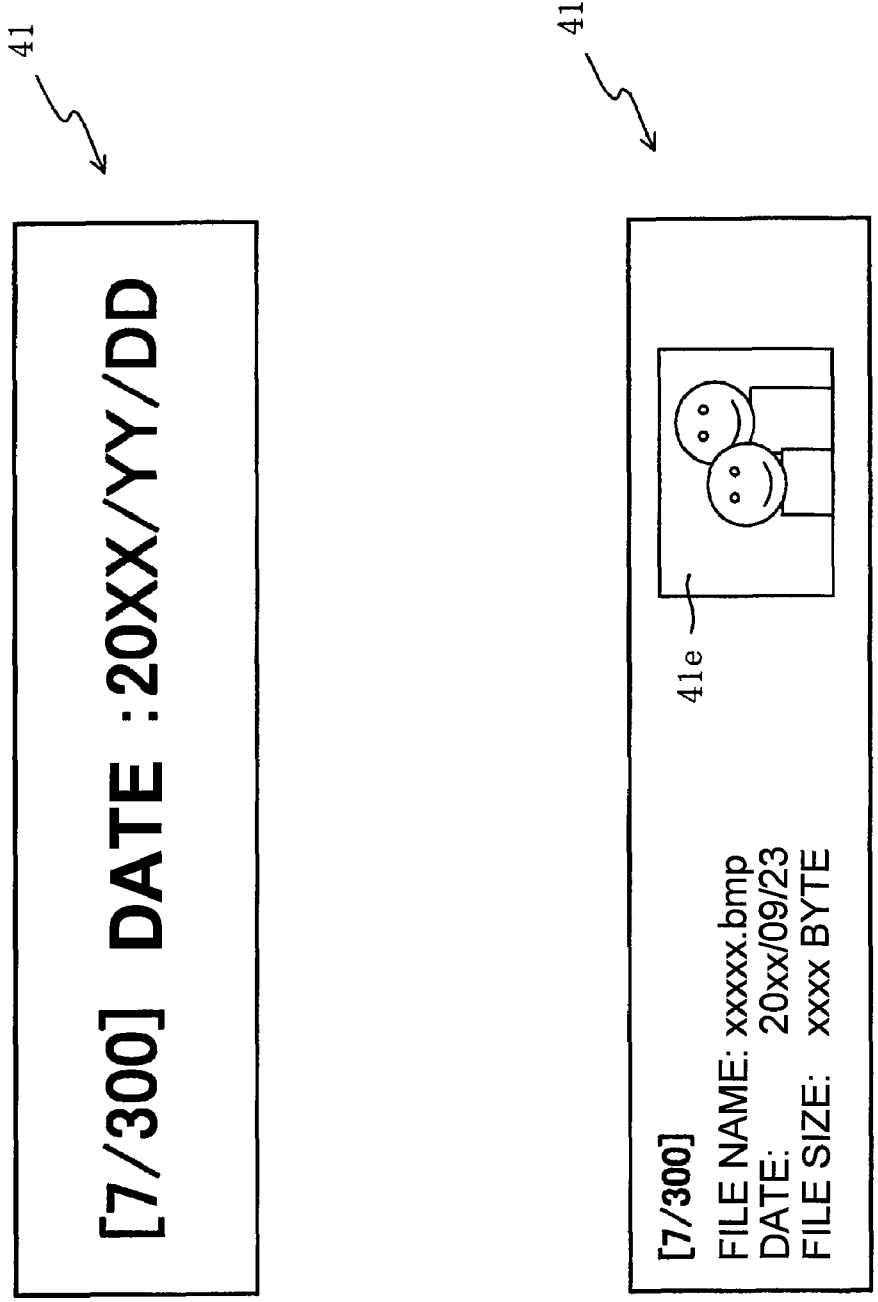

DISPLAY APPARATUS AND DISPLAY CONTROL PROGRAM

CROSS REFERENCE TO RELATED APPLICATION

This application claims priority from Japanese Patent Application No. 2007-305106 filed on Nov. 26, 2007, the entire subject matter of which is incorporated herein by reference.

BACKGROUND OF THE DISCLOSURE

1. Field of the Disclosure

The present disclosure relates to a display apparatus and a display control program.

2. Description of Related Art

It is known to array and display a large number of reduced images called "thumbnails" on the monitor of a personal computer, or on the liquid-crystal display panel of a printer.

FIG. 11A is an example of a thumbnail display screen displayed on the liquid-crystal display panel of a prior-art printer. A plurality of thumbnails 102 are arrayed and displayed on a single panel, allowing a user to look through image data to find desired data.

Here, the number of thumbnails which can be simultaneously displayed on the single panel is limited. In this prior-art thumbnail display screen, therefore, scroll keys 100 are provided, and the thumbnails 102 to be displayed are switched responsive to input from the user.

FIG. 11B shows a state where, after the display of the thumbnail display screen shown in FIG. 11A an input to the scroll key 100 has been made, causing the thumbnails 102 to be switched. More specifically, when the user gives an input instruction via the scroll key 100 when the thumbnails 102 having image data numbers 1 to 6 are displayed, the thumbnails 102 of image data number 7 et seq. are displayed on the screen.

Since, however, processing time is expended on reading out data for displaying the thumbnails 102, and on displaying the data on the screen, the prior art has had the problem that the wait time of the user is long before the display of the six thumbnails 102, e.g., as shown in FIG. 11A, is completed. Moreover, the wait time occurs each time the thumbnails 102 to be displayed are switched, as explained with reference to FIG. 11B, so that when the amount of image data to be reviewed is large, the wait time of the user increases, making it difficult to readily find the desired image data.

SUMMARY OF DISCLOSURE

The present disclosure addresses the above problems by providing a display apparatus in which text data associated with image data is switched and displayed, and a user is allowed to visually confirm the text data, so the user can rapidly find desired image data.

In one aspect of the present disclosure, a display apparatus includes a display panel; a user input switch for inputting a first switching instruction and a second switching instruction from the user; and a processor. The processor is configured to manage a display order of image data files and associated text data; select text data to be displayed, the text data corresponding to image data from a selected one of the image data files; and display the selected text data on the display panel responsive to the first switching instruction. The processor is also configured to continuously switch the displayed text data in the display order; judge whether the second switching instruction has been input by the user when the text data is being displayed; and shift the display to a display of 1) an image corresponding to the displayed text data and 2) an image string representing a plurality of the image data files which follow the image corresponding to the displayed text data in the display order when the second switching instruction is input.

Another aspect of the present disclosure is a computer-readable medium bearing instructions for controlling a display on a display panel. The instructions, when executed, are arranged to cause a processor to perform the steps of: managing a display order of image data files and associated text data; selecting text data to be displayed, the text data corresponding to image data from a selected one of the image data files; displaying the selected text data on the display panel responsive to a first switching instruction input by a user input switch operated by a user; continuously switching the displayed text data in the display order; judging whether a second switching instruction has been input by the user input switch when the text data is being displayed; and shifting the display to a display of 1) an image corresponding to the displayed text data and 2) an image string representing a plurality of the image data files which follow the image corresponding to the displayed text data in the display order when the second switching instruction is input.

A further aspect of the present disclosure is a display apparatus including management means for managing a display order, on a screen, of image data files and associated text data stored in a storage means; text data display means for selecting text data, the text data corresponding to image data from the image data files stored in the storage means, and for displaying the text data on the screen; input means for allowing a user to input a switch instruction for making a request for switching the text data; text data switching means for switching the text data in the display order managed by the management means, and for continuing the switching responsive to the input of the switch instruction by the input means; stop instruction judgment means for judging if a predetermined stop instruction has been inputted by the user, when the text data is being displayed by the text data display means; and image display means for shifting the display of the text data by the text data display means to a display of an image representing the image data file, when the input of the stop instruction has been judged by the stop instruction judgment means. The image display means selects a plurality of image data files corresponding to the text data displayed at the input of the stop instruction, and which follow in the display order, and the image display means displays an image string representing the plurality of image data files.

BRIEF DESCRIPTION OF THE DRAWINGS

Illustrative aspects of the disclosure will be described in detail with reference to the following figures, wherein:

FIG. 2 is a block diagram showing the schematic configuration of the control unit of the multifunctional machine;

FIG. 3A shows an example of a normal display mode screen, while

FIGS. 10A and 10B show fast display mode screens in modified embodiments; and

FIG. 11A is an example of a thumbnail display screen displayed on the liquid-crystal display panel of a prior-art printer, while

DETAILED DESCRIPTION

Figure 1:
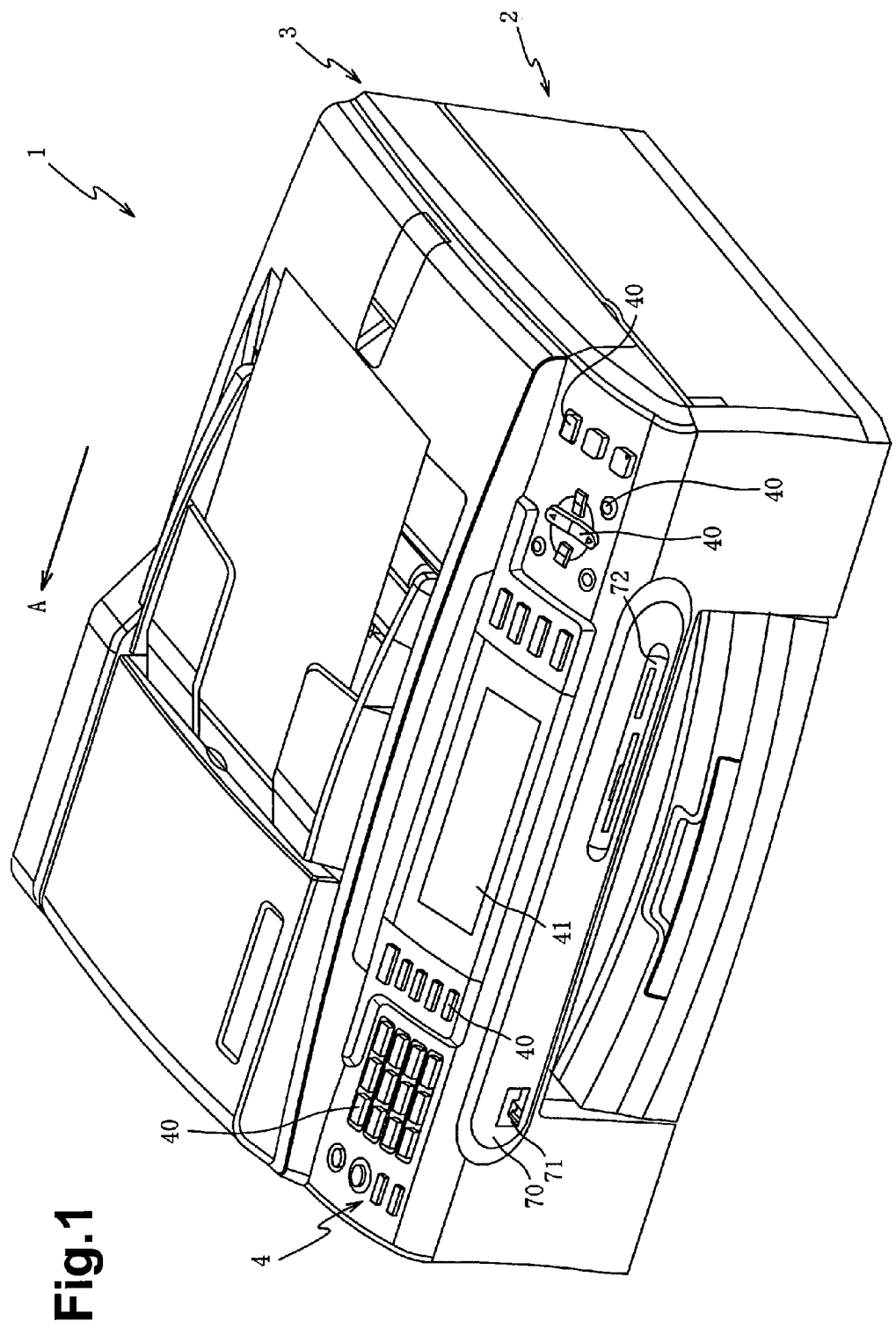
FIG. 1 is a perspective view showing the external appearance configuration of a multifunctional machine according to the present disclosure.

Now, embodiments of the present disclosure will be described with reference to the accompanying drawings. FIG. 1 is a perspective view showing the external appearance configuration of a multifunctional machine 1 which is one embodiment of a display apparatus according to the present disclosure. The multifunctional machine 1 is capable of switching between a normal display mode in which the thumbnails of image data stored in a memory card are displayed, and a fast display mode in which the text data of the image data stored in the memory card is displayed. This multifunctional machine 1 is configured so that a user can rapidly find desired image data by utilizing the fast display mode on occasion.

The multifunctional machine 1 is an MFD (Multi Function Device) including a printer 2 disposed at a lower part, a scanner 3 disposed at an upper part, and an operation panel 4 disposed on the front side of the scanner 3. It has a scanner function, a copy function and a facsimile function.

In addition, the multifunctional machine 1 is connectable to an external device such as a USB memory, a digital camera or a personal computer for recording data received from the external device on printing paper. It can also display the data received from the external device or data loaded from a memory card, on a liquid crystal display (LCD) panel 41 on the operation panel 4.

The operation panel 4 also serves to operate the printer 2 and the scanner 3, and includes various keys 40 and the LCD 41.

The LCD 41 is formed in a rectangular shape whose longitudinal direction (width direction) is the direction of an arrow A, and it has an aspect ratio of 3 to 8 with the width direction being a lateral direction. More concretely, the LCD 41 is configured such that two independent LCDs each of which has a rectangular shape having an aspect ratio of 3 to 4, are mounted adjacent to each other in the direction of the arrow A and attached to each other. In the figure, however, the LCD 41 is not shown to scale.

The LCD 41 is integrally configured with a well-known touch panel, which functions as a user input switch. When the user touches the thumbnail, an icon or the like displayed on the LCD 41, he/she selects the thumbnail, the icon or the like touched, from touched coordinates on the LCD 41. The touch panel in this embodiment is operated by the user to select the thumbnail the icon or the like when a finger or the like of the user comes into physical contact with it. However, it can, of course, be replaced with a touch panel by which the user selects the thumbnail, the icon or the like by approaching it with a finger or the like.

When a predetermined command is inputted to the multifunctional machine 1, the operation of the multifunctional machine 1 is controlled by a control unit 20 (see FIG. 2) on the basis of the inputted information. Incidentally, the multifunctional machine 1 is configured to operate on the basis of not only the command inputted from the operation panel 4, but also a command transmitted from the computer through a printer driver, a scanner driver or the like.

A connection panel 70 is disposed below the operation panel 4. A USB terminal 71 is arranged on the left end of the connection panel 70. The USB terminal 71 is a connector terminal which can be USB-connected with external equipment, to communicably connect the external equipment and the multifunctional machine 1.

A slot portion 72 is arranged on the right end of the connection panel 70. The slot portion 72 is provided with a plurality of card slots into each of which a memory card (card type memory) can be detachably mounted. The memory card is inserted into the card slot, and image data can be read out from the mounted memory card by the control unit 20 as explained below.

The schematic configuration of the control unit 20 for controlling the operation of the multifunctional machine 1 will be described with reference to the block diagram of FIG. 2. The control unit 20 generally controls the operation of the multifunctional machine 1 which includes the printer 2, the scanner 3 and the operation panel 4.

The control unit 20 is a microcomputer which includes a CPU (Central Processing Unit) 21 which performs the steps disclosed herein electronically, a ROM (Read Only Memory) 22, a RAM (Random Access Memory) 23, and an EEPROM (Electrically Erasable and Programmable ROM) 24. This control unit 20 is connected to an ASIC (Application Specific Integrated Circuit) 26 through a bus 25.

The CPU 21 is a central processor for collectively controlling the multifunctional machine 1, and it operates according to a computer-readable medium (programs) stored in the ROM 22. The programs for controlling the various operations of the multifunctional machine 1 are stored in the ROM 22, along with a display control program 22a for executing processes shown by flow charts in FIGS. 5 to 9.

The RAM 23 is used as a storage area or a work area in which various data to be used when the CPU 21 runs the program are temporarily recorded, and it is provided with a management memory 23a, an image data memory 23b, a file information memory 23c, and a display area management memory 23d.

The management memory 23a is a memory which manages image data numbers (an example of a display sequence) associated with the respective image data stored in the memory card 72a.

In this embodiment, the image data stored in the memory card 72a is image data photographed by a digital camera, and a photographing date and hour are contained as file information in each image data file. The CPU 21 reads out the file information items from the respective image data in the memory card 72a, sorts the file information items in accordance with the photographing dates and hours, and assigns image data numbers to the respective image data in the sequence of the photographing dates and hours. In this way, the CPU 21 manages the display order of image data files and associated text data on memory card 72a. In a display process to be explained later, the thumbnails or text data of the image data are displayed in the order of the image data numbers stored in the management memory 23a; that is, in the order of the photographing dates of the image data. The "photographing dates" referred to herein are examples of "creation dates".

The image data memory 23b is a memory in which image data files loaded from the memory card 72a mounted into the slot portion 72 is stored. This image data is subjected to a reduction process, whereby data for displaying the thumbnails on the LCD 41 is created.

The file information memory 23c is a memory in which the file information items 41c (see FIG. 3B) loaded from the memory card 72a are stored. Each of the file information items 41c is information which contains a filename (image data name), the photographing date and a file size (data size), and it is previously added to each corresponding image data file.

Figure 3A:
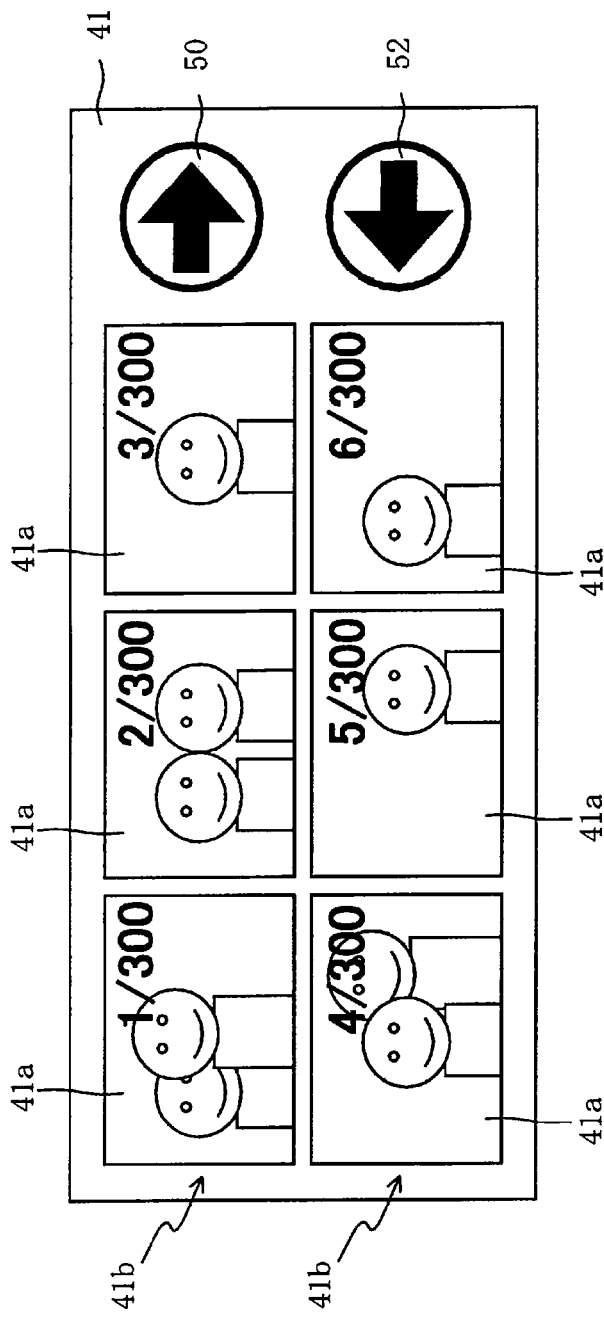

The thumbnails and text data which are displayed in the order of the image data numbers will be described in more detail with reference to FIGS. 3A and 3B. FIG. 3A is an example of a normal display mode screen which is displayed on the LCD 41. As shown in FIG. 3A, the normal display mode screen is a screen in which the thumbnails 41a (reduced images of the respective image data stored in the memory card 72a are displayed in the order of the image data numbers.

As shown in FIG. 3A, the image data numbers corresponding to the thumbnail 41a and the total number of accessible image data files (300 files in FIG. 3A) in the memory card 72a are displayed at the right upper corner within each thumbnail display area. Accordingly, the user can roughly grasp to which of the thumbnails the thumbnails 41a currently seen by him/her correspond.

The thumbnails 41a constitute a thumbnail string 41b arranged so that the image data numbers increase from left to right. In the example shown in FIG. 3A, the thumbnail string 41b is displayed divided into upper and lower stages.

Hereinafter, among the thumbnails 41a constituting the thumbnail string 41b, the thumbnail 41a which lies at a left upper end of the LCD 41 and whose image data number is the lowest shall be termed the "head thumbnail." The thumbnail 41a which lies at a right lower end of the LCD 41 and whose image data number is the largest shall be termed the "tail thumbnail."

As shown in FIG. 3A, in the normal mode display screen, a right scroll icon 50 and a left scroll icon 52 are displayed in a display area at the right of the thumbnail string 41b. Since the LCD 41 is configured integrally with the touch panel as stated before, the user can input a switching instruction by touching the right or left scroll icon 50 or 52.

In this embodiment, it shall be referred to as a "long press" to touch the right or left scroll icon 50 or 52 continuously for at least a predetermined time period, that is, to continue the switching instruction for at least a predetermined time period. On the other hand, it shall be referred to as a "short press" to input the switching instruction for a time period shorter than the predetermined time period; that is, to touch the right or left scroll icon 50 or 52 for a time period shorter than the predetermined time period. As will be detailed below, different functions are assigned to a switching instruction based on a "long press" of the right or left scroll icon 50 or 52, and a switching instruction based on a "short press."

First, the function assigned to the "short press" of the right or left scroll icon 50 or 52 will be explained. In the multifunctional machine 1, a process for switching the image data to be displayed in the order of the image data numbers is executed responsive to a "short press" of the right or left scroll icon 50 or 52. More specifically, when the right scroll icon 50 is subjected to the "short press," the image data of the thumbnails 41a to be displayed are switched in a direction in which the image data numbers increase. To the contrary, when the left scroll icon 52 is subjected to the "short press," the image data of the thumbnails 41a to be displayed are switched in a direction in which the image data numbers decrease.

By way of example, when the right scroll icon 50 is subjected to the "short press" when the thumbnails 41a of image data numbers "1" to "6" are displayed as shown in FIG. 3A, an image data number "7" next to the image data number "6" of the tail thumbnail is determined to be the image data number of the next head thumbnail 41a. In addition, the thumbnails 41a of image data numbers "7" to "12" are displayed on the screen.

Thus, the thumbnails can be displayed in the order of the image data numbers every predetermined number of thumbnails (every six thumbnails in the example shown in FIG. 3A) by subjecting the right or left scroll icon 50 or 52 to the "short press."

Next, the function assigned to the "long press" of the right or left scroll icon 50 or 52 will be explained. In the multifunctional machine 1 of this embodiment, a "shift instruction" which switches the normal display mode screen to a fast display mode screen is assigned to the "long press" of the right or left scroll icon 50 or 52.

A fast display mode screen will be described with reference to FIG. 3B. As shown in FIG. 3B, the fast display mode screen is a screen which displays the text data 41c on the LCD 41. The text data 41c consists of file information 41c1 corresponding to one image data file, and display order information 41c2 containing the image data number. As shown in FIG. 3B, the file information 41c1 contains a filename, a photographing date and a file size. The text data 41c is displayed on the LCD 41, so the user can guess the contents of the image data.

Figure 3B:
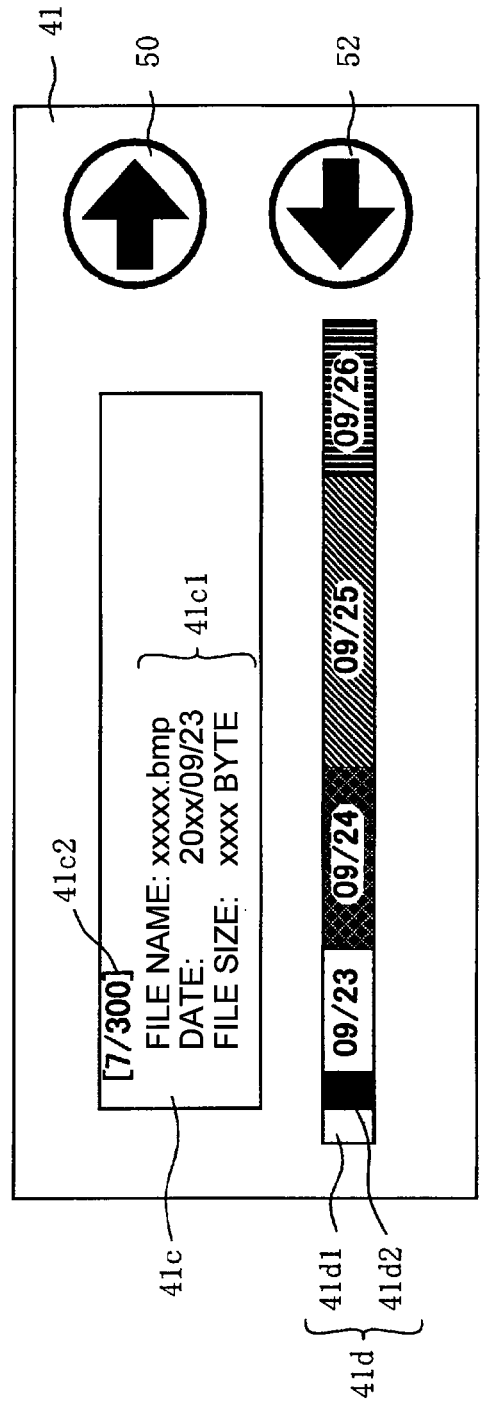
FIG. 3B shows an example of a fast display mode screen.

As shown in FIG. 3B, in the fast display mode screen, the right and left scroll icons 50 and 52 are displayed in a display area at the right of the text data 41c in the same manner as in the normal display mode screen shown in FIG. 3A.

As stated above, when the right or left scroll icon 50 or 52 is subjected to the long press in the normal display mode screen, the normal display mode screen of FIG. 3A is shifted to the fast display mode screen of FIG. 3B. Here, when the long press of the right or left scroll icon 50 or 52 is continued after the shift, the text data 41c is switched in the order of the image data numbers, and the switching continues.

More specifically, when the "long press" of the right scroll icon 50 is continued, the fast display mode screen is displayed, the displayed text data 41c is successively switched in descending order of the image data numbers to successively switch and display the text data 41c. On the other hand, when the "long press" of the left scroll icon 52 is continued, the displayed text data 41c is successively switched in ascending order of the image data numbers, to successively switch and display the text data 41c. The switching of the text data 41c is continuously performed as long as the right or left scroll icon 50 or 52 is held in the long press.

Load and display processes can be executed for the text data 41c in shorter time periods than for the image thumbnails 41a. Therefore, the switching process is executed for the fast display mode screen at a higher speed than for the normal display mode screen. As a result, even when a large number of image data files are stored in the memory card 72a, the user can browse the text data 41c in a short time.

Further, the switching of the text data 41c proceeds in a sequence in which a predetermined number of image data numbers are skipped. For example, when the text data 41c of the image data number "1" is displayed, the text data 41c of image data number "7" is displayed as the next text data, skipping six image data numbers. In this way, the text data is quickly switched and displayed up to the text data 41c whose image data number is the maximum value.

Additionally, because the "long press" of the right or left scroll icon 50 or 52 for instructing to shift the normal display mode screen to the fast display mode screen can be continued for switching the text data 41c automatically and continuously, the operating procedure is simple and is easily memorized by the user. Further, the display order information 41c2 in which the image data number of the image data to be displayed and the total number of the image data files are arrayed is displayed as the text data 41c. Therefore, the user can roughly guess what number the desired image data corresponds to among all the image data files, and can be browse the text data 41c to rapidly find the desired image data.

Further, as shown in FIG. 3B, a scroll bar 41d is displayed under the text data 41c in the fast display mode screen. The scroll bar 41d is formed as an image which contains a bar 41d1 corresponding to the total number of the accessible image data files, and a mark 41d2 at a position along the length of the bar 41d1. The distance from the left end of the bar 41d1 to the indicating position of the mark 41d2 corresponds to an image number of the displayed text data 41c relative to the total number of the image data files. Accordingly, the user can intuitively grasp whether or not the displayed text data is approaching the desired image data, from the indicating position of the mark 41d2 (that is, the display position).

Additionally, as shown in FIG. 3B, the bar 41d1 has its longitudinal direction divided into a plurality of areas. In addition, a photographing date of the image data is assigned to each of the areas, and the respective areas are depicted in colors differing from one another. In this way, the bar 41d1 visually differentiates each creation date of the image data files. Note that in FIG. 3B, the differences of the colors of the respective areas are represented by cross-hatching. Therefore, the user can rapidly grasp on what day the image data corresponding to the text data 41c presently displayed was photographed, and he/she can easily notice the change of the photographing date when the text data 41c is successively switched and displayed, so that he/she can readily find the desired image data. The display color of the photographing date in the text data 41c is the same as the color of the area corresponding to the photographing date in the bar 41d1.

Next, a case where the "long press" of the right or left scroll icon 50 or 52 is ended in the fast display mode screen will be explained with reference to FIGS. 4A and 4B. A switching instruction called a "stop instruction" for stopping the fast display mode is assigned to the manipulation of ending the "long press" of the right or left scroll icon 50 or 52.

Figure 4A:
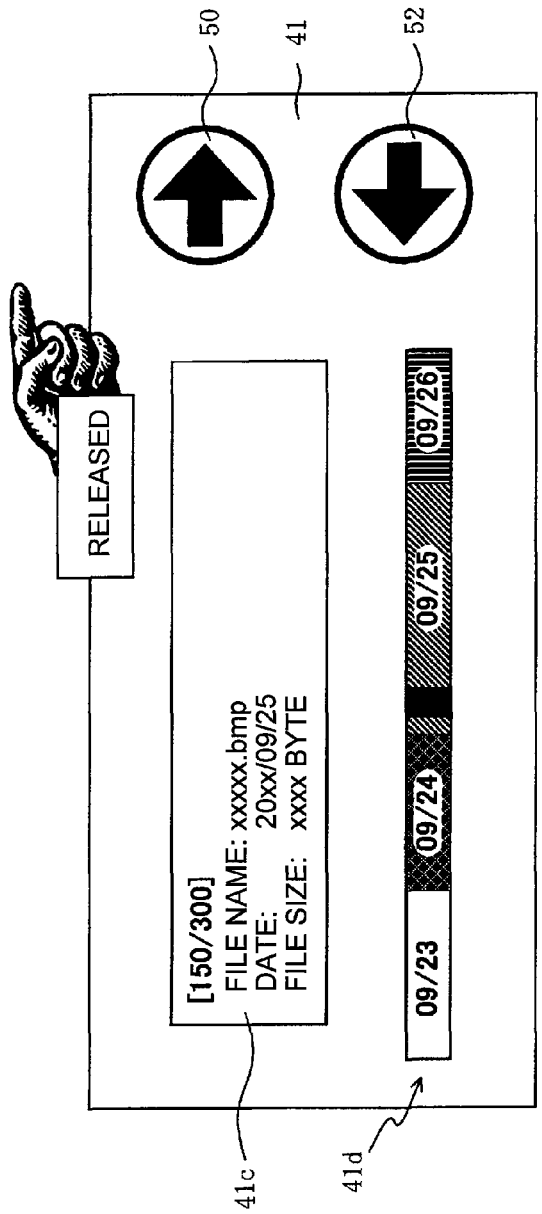
FIGS. 4A and 4B are for explaining the transition of the screens when a long press on a right or left scroll icon has ended during display of the fast display mode screen.
Figure 4B:
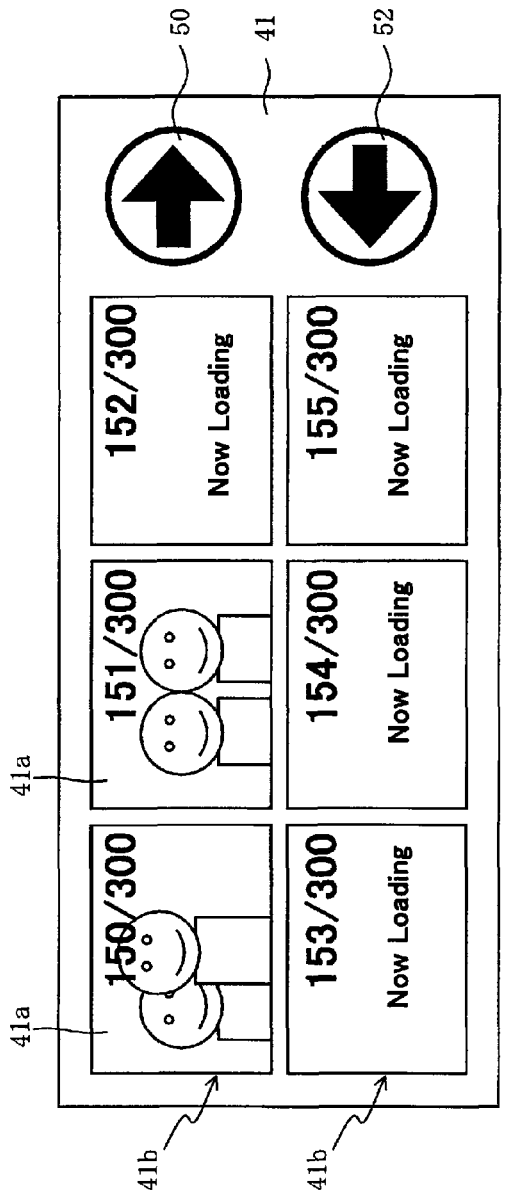

In the multifunctional machine 1 of this embodiment, when the "long press" of the right or left scroll icon 50 or 52 is ended during the display of the fast display mode screen as shown in FIG. 4A, the display on the LCD 41 is shifted to the normal display mode screen shown in FIG. 4B.

As shown in, FIG. 4B, the thumbnail string 41b which is displayed on the normal display mode screen contains the thumbnails 41a of image data corresponding to the text data 41c displayed at the end of the long press of the right or left scroll icon 50 or 52, and image data representing a plurality of image data files which follow the image corresponding to the displayed text data 41c. For example, where the text data 41c of image data number "150" was displayed at the end of the long press of the right or left scroll icon 50 or 52, the image data of the image data number "150" and a plurality of succeeding thumbnails 41a are displayed, and the display on the LCD 41 is switched to the normal display mode screen containing these thumbnails 41a.

Therefore, in a case where the user viewing the normal display mode screen has looked at the thumbnails 41a and the total number of the image data files and where he/she has judged that a large number of image data files must be scrolled through before the desired image data is reached, he/she can subject the right or left scroll icon 50 or 52 to the "long press", thereby shifting the normal display mode screen to the fast display mode screen. In addition, if he/she continues the "long press" of the right or left scroll icon 50 or 52, the display on the LCD 41 shifts from the normal display mode screen to the fast display mode screen, and the text data 41c is successively switched in descending order or ascending order of the image data numbers.

When the user finds the text data 41c expected to correspond to the desired image data or the text data 41c expected to closely relate to the desired image data while watching the text data 41c or scroll bar 41d switched and displayed in succession, the user ends the "long press" of the right or left scroll icon 50 or 52. Then, the display on the LCD 41 shifts to the display of a thumbnail string 41b which includes the image data corresponding to the text data 41c at that time, and a plurality of succeeding image data. Therefore, the user can judge the contents of the respective image data in detail from the thumbnail string 41b. In this manner, according to the multifunctional machine 1 of this embodiment, the text data 14c associated with the image data is switched and displayed, and the user can visually confirm this text data 14c, and can rapidly find the desired image data.

Moreover, when the user subjects the right or left scroll icon 50 or 52 to the "short press," he/she can switch the thumbnails to be displayed as in a frame feed, and when the user subjects the right or left scroll icon 50 or 52 to the "long press," he/she can visually confirm the text data 41c in succession while switching them at a high speed, as in a fast forward or a rewind operation. Further, when the user ends the "long press" of the right or left scroll icon 50 or 52, he/she can visually confirm the thumbnail string 41b representative of the plurality of image data files which contain the image data to be displayed in correspondence with the text data 41c at that time, as in stopping a fast forward or a rewind operation. Therefore, the disclosed method is easy, intuitive, and highly convenient for the user.

Referring back to FIG. 2, the display area management memory 23d stores therein the display areas of the thumbnails 41a and the text data 41c which are displayed on the LCD 41, or the display areas of the various icons such as the right and left scroll icons 50 and 52, in association with coordinates on the LCD 41.

The EEPROM 24 is a rewritable nonvolatile memory. The ASIC 26 controls the operations of the printer 2, scanner 3, operation panel 4, slot portion 72, etc. in compliance with commands from the CPU 21.

A panel gate array 27 (panel GA 27) which controls the keys 40 for inputting desired commands to the multifunctional machine 1, an LCD controller 28 which controls the screen display of the LCD 41, a parallel interface 29, the USB terminal 71, and a loudspeaker 74 through an amplifier 73 are connected to the ASIC 26. Further, an NCU (Network Control Unit) 31 is connected to the ASIC 26, and a modem 32 is connected to the NCU 31.

Next, a process for displaying the normal display mode screen or the fast display mode screen as executed by the multifunctional machine 1 of this embodiment will be described with reference to FIGS. 5 to 9.

Figure 5:
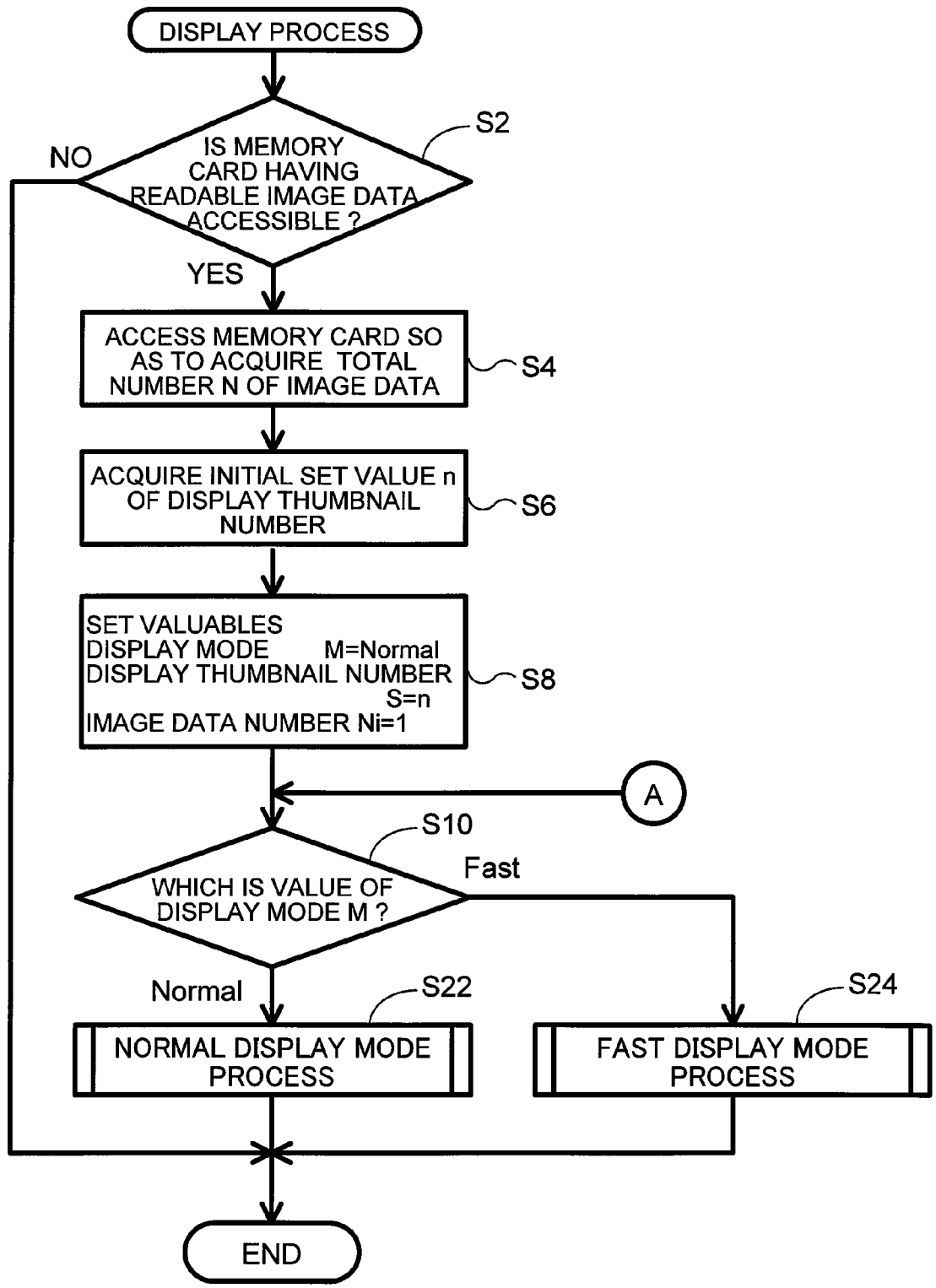
FIG. 5 is a flow chart showing a display process.

FIG. 5 is a flow chart showing the display process which is executed in the multifunctional machine 1. This display process is a process which is executed when memory card 72a has been inserted into the slot portion 72, and which displays either the normal display mode screen or the fast display mode screen on the LCD 41.

First, it is judged whether or not the memory card 72a having readable image data is accessible (S2). In a case where the judgment at step S2 is negative (S2: "No"), the process is ended. On the other hand, when the judgment at the step S2 is positive (S2: "Yes"), the memory card 72a mounted into the slot portion 72 is subsequently accessed to acquire the total number N of the accessible image data files (S4).

Subsequently, the initial set value n of a "display thumbnail number S" which represents how many thumbnails 41a are to be displayed in the normal display mode screen is acquired from the EEPROM 24 (S6). The initial set value n is a value which is previously set by the user, and is alterable in accordance with a user instruction.

Subsequently, variables are set. First, a value "Normal" which represents the normal display mode is set in the variable "display mode M" (S8). The initial set value n is assigned in the variable "display thumbnail number S". Further, an initial value "1" is set in the variable "image data number Ni". This variable "image data number Ni" is a variable which represents the image data number of the head thumbnail (i.e., the image data number of the thumbnail located at the left upper end in the normal display mode screen).

By setting the variables in this manner, the thumbnails headed by the image data number "1" are displayed in the normal display mode screen in a normal display mode process (S22) to be explained later.

Subsequently, it is judged whether the value of the variable "display mode M" is "Normal" or "Fast" (representing the fast display mode)(S10). When the value of the "display mode M" is "Normal" (S10: "Normal"), the normal display mode process (S22) is executed. On the other hand, when the value of the "display mode M" is "Fast" (S10: "Fast"), a fast display mode process (S24) is executed.

Figure 6:
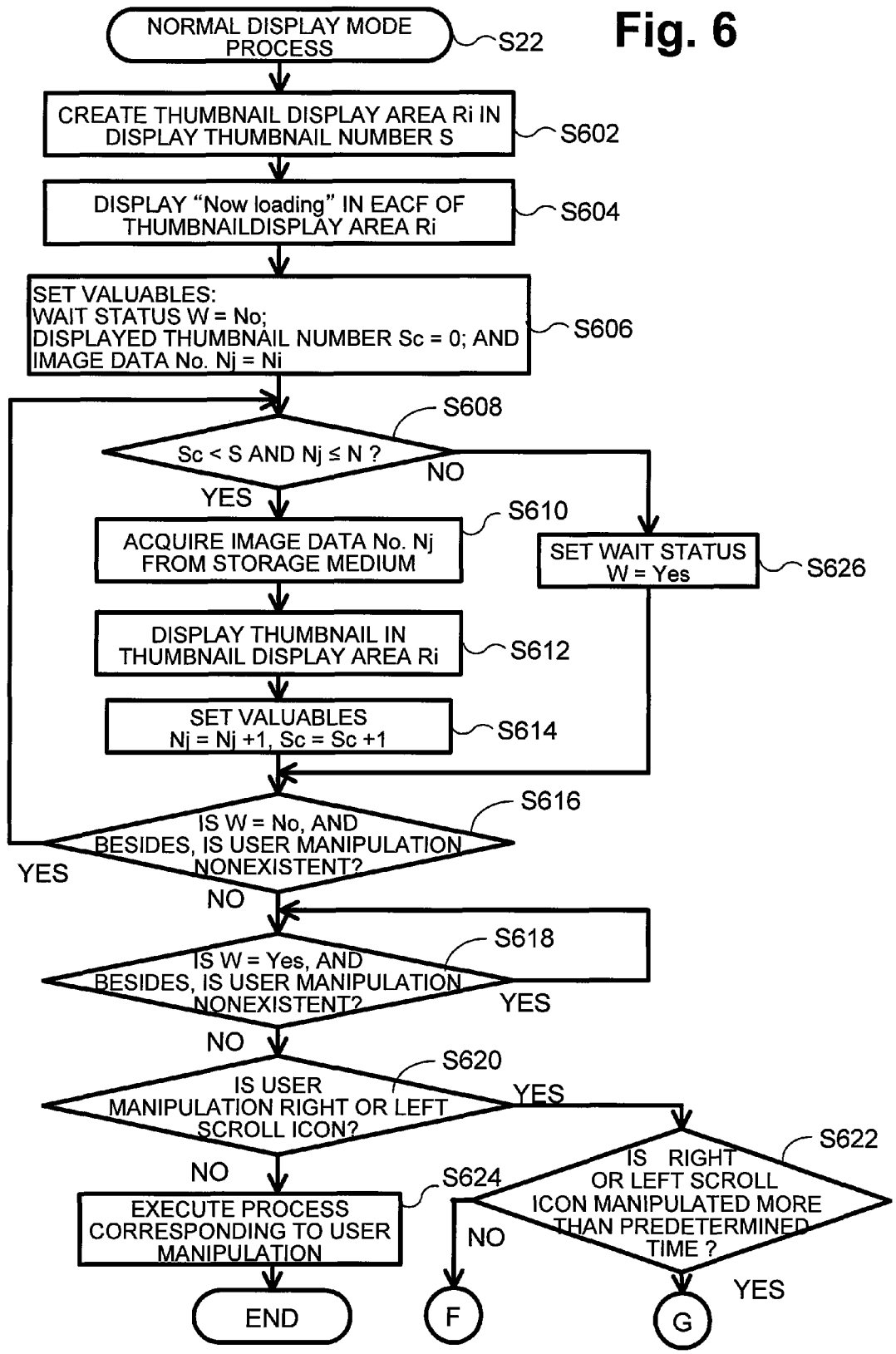
FIG. 6 is a flow chart showing a normal display mode process.

The normal display mode process (S22) will be described with reference to FIG. 6. This normal display mode process (S22) is a process which displays the normal display mode screen explained with reference to FIG. 3A.

First, thumbnail display areas Ri are created in the display thumbnail number S and are stored in the display area management memory 23d shown in FIG. 2 (S602). Subsequently, "Now Loading" is displayed in each of the thumbnail display areas Ri (S604). In addition, variables are set (S606). First, "0" is set in the variable "displayed thumbnail number Sc." The variable "displayed thumbnail number Sc" represents the number of the thumbnails 41a already displayed in the normal display mode screen. In processing to be explained later, "1" is added to the value of the variable "displayed thumbnail number Sc" each time the display of one thumbnail 41a is completed.

A value "No" is set in a variable "wait status W" which indicates whether or not the multifunctional machine is waiting for an instruction from the user. The value "No" is a value which indicates that a thumbnail in a display wait status exists in the normal display mode screen; in other words, that a thumbnail display area Ri displayed as "Now Loading" exists.

Initially, a thumbnail is not displayed yet, and hence, "No" is set as the "wait status W". When the displays of the thumbnails 41a have been completed in all the thumbnail display areas Ri, the value of the variable "wait status W" is altered to "Yes".

"Ni" is set in the variable "display image data number Nj" which represents the image data number of the thumbnail 41a to be subsequently displayed. By setting the variables in this manner, display processes are started successively from the thumbnail whose image data number is "Ni" in subsequent processing.

First, it is judged if a condition (Sc<S and Nj≦N), under which the displayed thumbnail number Sc is less than the display thumbnail number S and under which the display image data No. Nj is, at most, the total number N of the image data, is satisfied (S608). Initially, the judgment at the step S608 is affirmed (S608: "Yes"), so that the image data whose image data number is "Nj" is subsequently acquired from the memory card 72a (S610) to display the corresponding thumbnail in the thumbnail display area Ri (S612).

When one thumbnail is displayed in the screen anew in this way, "1" is subsequently added to each of the values of the number "Nj" and the variable "displayed thumbnail number Sc" (S614). In addition, whether or not the value of the "wait status W" is "No," and whether any user manipulation of the LCD 41 is nonexistent is judged (S616). When the judgment at step S616 is positive (S616: "Yes"), the routine returns to step S608 so as to repeat the processing. Incidentally, when the routine returns to step S608, "1" is added to the suffix "i" of the thumbnail display area Ri representing the area where the thumbnail is to be subsequently displayed.

When, after the repetition of the processing in such a manner, displays of S thumbnails have been completed or displays of the thumbnails of all the accessible image data have been completed, the judgment at step S608 is negative (S608: "No"). Therefore, a value "Yes" is subsequently set in the variable "wait status W" (S626).

Subsequently, step S626 shifts to the processing of step S616. Here, since the value of the variable "wait status W" is "Yes", the judgment at step S616 is negative (S616: "No"). In addition, whether or not the value of the "wait status W" is "Yes", and whether user manipulation of the LCD 41 is nonexistent is judged (S618). When the judgment at step S618 is positive; that is, where the displays of the S thumbnails 41a have been completed and where user manipulation is nonexistent (S618: "Yes"), the routine stands by.

On the other hand, where user manipulation of the LCD 41 has been made, the judgment at step S616 is negative, and the judgment at step S618 is negative (S616: "No", and S618: "No"). In this case, whether the user manipulation is of the right or left scroll icon 50 or 52 is subsequently judged (S620). Where the judgment at step S620 is negative (S620: "No"), a process corresponding to the user manipulation is executed (S624), and the routine is ended.

Figure 8:
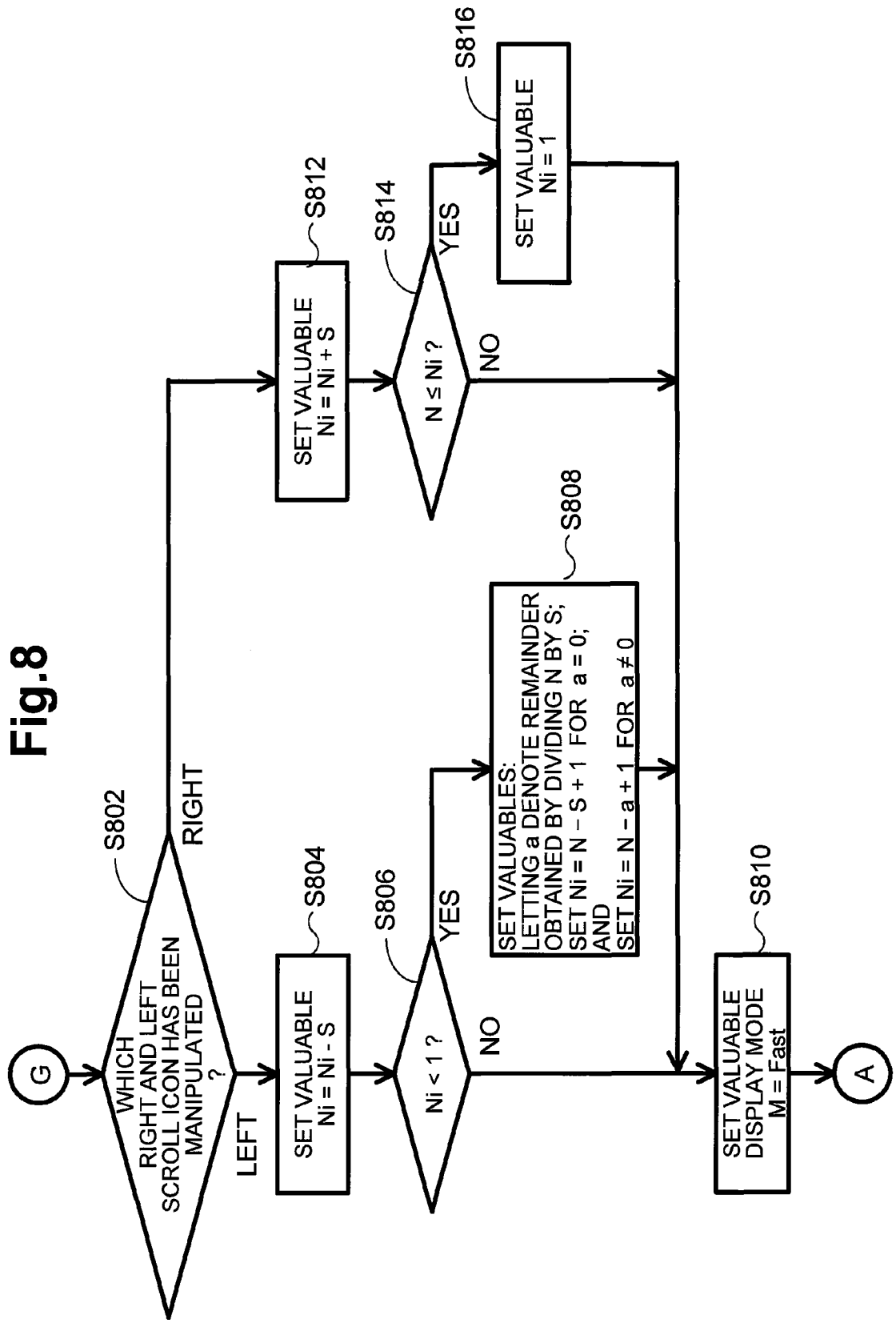
FIG. 8 is a flow chart showing processing executed when the right or left scroll icon has been subjected to a "long press", and which serves to determine text data corresponding to image data to be displayed on an LCD.

On the other hand, where the user manipulation is of the scroll icon 50 or 52, whether or not the manipulation continues for at least a predetermined time period; that is, whether or not the manipulation is the "long press" of the right or left scroll icon 50 or 52, is judged (S622). Where the judgment at step S622 is positive (S622: "Yes"), the routine shifts to a process for displaying the fast display mode screen as shown in FIG. 8, and the details will be explained later.

On the other hand, where the judgment at step S622 is negative (S622: "No"); that is, where the manipulation is the "short press" of the right or left scroll icon 50 or 52, the routine shifts to a process for switching the image data to-be-displayed as shown in FIG. 7.

Figure 7:
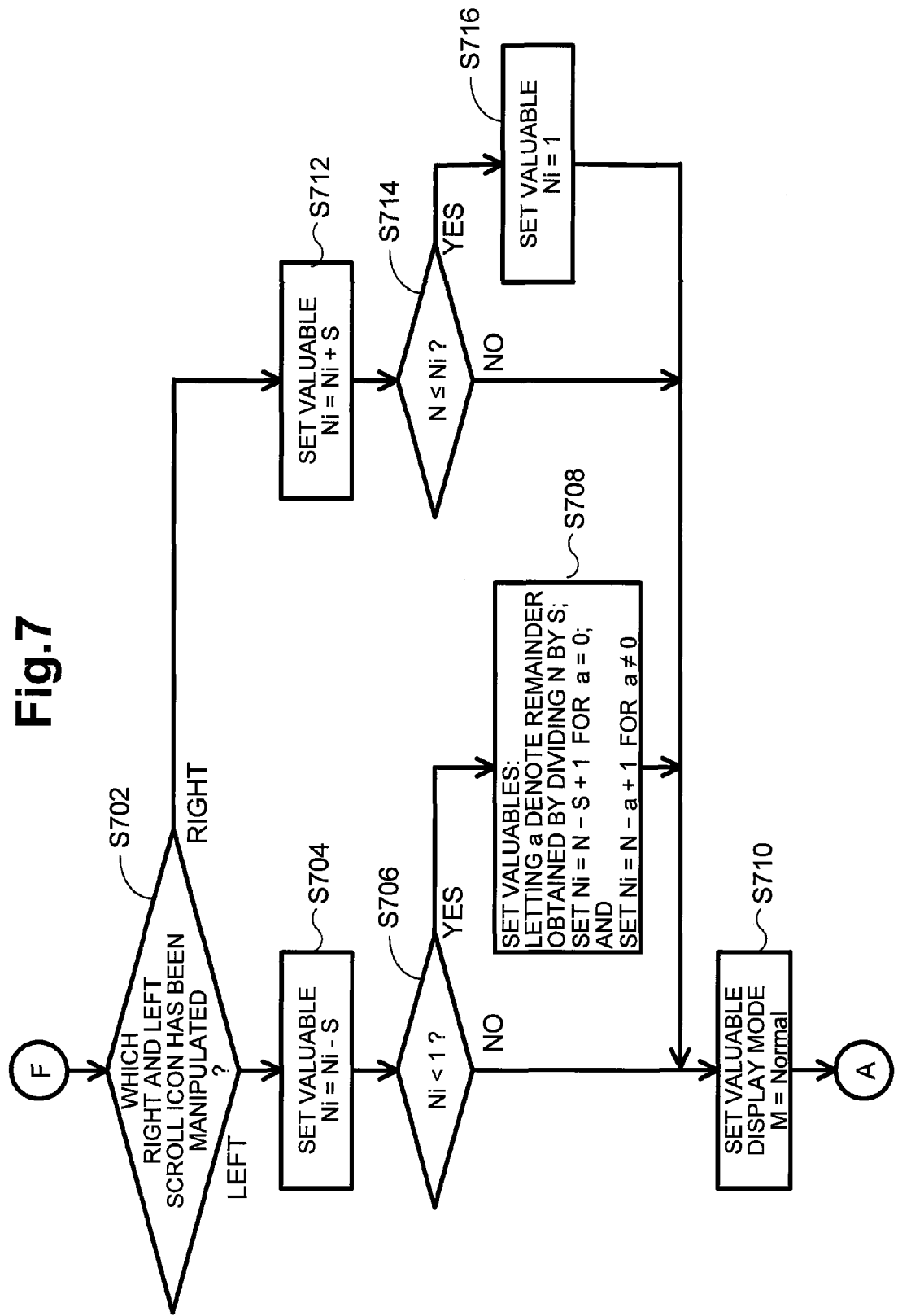
FIG. 7 is a flow chart showing processing which is subsequent to the normal display mode process shown in FIG. 6.

FIG. 7 is a flow chart showing a process which is executed subsequently to the normal display mode process (S22) shown in FIG. 6. The image data which corresponds to the thumbnails to be displayed is determined by the processing shown in FIG. 7.

First, which of the right and left scroll icons 50 and 52 has been subjected to the "short press" is judged (S702). In case of the judgment that the right scroll icon 50 has been subjected to the "short press" (S702: "right scroll icon"), the image data to be displayed is altered in the direction in which the image data numbers increase.

More specifically, the value of the variable "display thumbnail number S" is added to the value "Ni" which represents the image data number of the head thumbnail (S712). Thus, where the thumbnail string 41*b* of the image data numbers "1" to "6" is presently displayed on the LCD 41, the thumbnail of the value obtained by adding the display thumbnail number "6" to the image data number "1" of the head thumbnail (i.e.; the thumbnail of image data No. "7") is determined as the head thumbnail of the thumbnail string 41*b* which is to be displayed next. As a result, in the normal display mode screen displayed next, the thumbnail string 41*b* constituted by the thumbnails of image data numbers "7" to "12" is displayed on the LCD 41.

Subsequently, whether or not the variable "Ni" is, at least, the total number N of the accessible image data is judged (S714). Where the judgment at step S714 is positive (S714: "Yes"), the variable "Ni" is set at "1" (S716). That is, the thumbnail of the image data number "1" is determined as the next head thumbnail. On the other hand, in a case where the judgment at step S714 is negative (S714: "No"), the routine shifts to the processing of step S710, skipping step S716.

Thus, in subsequent processing, the thumbnails are switched and displayed in the direction in which the image data numbers increase. When the variable "Ni" becomes at least the total number N of the image data files in the repetition of the switching displays, the value of the variable "Ni" is returned to "1".

On the other hand, when the left scroll icon 52 has been subjected to the "short press" (S702: "left scroll icon"), the image data which correspond to the thumbnails to be displayed are altered in the direction in which the image data numbers decrease.

More specifically, the value of the variable "display thumbnail number S" is subtracted from the image data number "Ni" of the head thumbnail (S704). Thus, for example, where the thumbnail string 41*b* presently displayed is constituted by the thumbnails 41*a* of the image data Nos. "7" to "12," the thumbnail 41*a* of the value obtained by subtracting the display thumbnail number "6" from the image data number "7" (i.e.; the thumbnail 41*a* of the image data No. "1") is selected as the head thumbnail of the thumbnail string 41*b* to be displayed next. As a result, in the normal display mode screen displayed next, the thumbnail string 41*b* constituted by the thumbnails of the image data numbers "1" to "6" is displayed on the LCD 41.

Subsequently, whether or not the variable "Ni" has become less than "1" is judged (S706). Where the judgment at step S706 is negative (S706: "No"), the routine shifts to step S710. On the other hand, where the variable "Ni" has become less than "1" (S706: "Yes"), a remainder obtained by dividing the total number N of the image data by the display thumbnail number S is denoted by "a." If a=0, the value "Ni" representing the image data number of the head thumbnail is set at "N−S+1". On the other hand, if a≠0, the value "Ni" representing the image data number of the head thumbnail is set at "N−a+1" (S708).

When the image data number of the next thumbnail to be displayed in the normal display mode screen is determined as stated above, "Normal" signifying the normal display mode is subsequently set as the value of the variable "display mode M" (S710).

In addition, the routine returns to the processing of step S10 shown in FIG. 5, and the normal display mode process (S22) is executed. As a result, each time the right or left scroll icon 50 or 52 is subjected to the "short press," the thumbnail string 41*b* is switched and displayed in the direction in which the image data numbers increase or in the direction in which the image data numbers decrease.

Next, referring back to FIG. 6, there will be described a case where the right or left scroll icon 50 or 52 has been subjected to the "long press" by the user while the thumbnail string 41*b* is displayed by the normal display mode screen. In this case, the judgment at step S622 shown in FIG. 6 is positive (S622: "Yes"), and the routine shifts to processing shown in FIG. 8. In addition, the processing for shifting the display on the LCD 41 from the normal display mode screen to the fast display mode screen is executed.

FIG. 8 shows the processing which is executed when the right or left scroll icon 50 or 52 has been subjected to the "long press", and which serves to determine the text data 41*c* (refer to FIG. 3B) that is displayed in correspondence with the image data.

First, which of the right and left scroll icons 50 and 52 has been subjected to the "long press" is judged (S802). If the right scroll icon 50 has been subjected to the "long press" (S802: "right scroll icon"), the value of the variable "display thumbnail number S" is added to the value of the variable "Ni" (S812). Although the variable "Ni" has been defined as the value representing the image data number of the head thumbnail during the normal display mode, it is a value representing the image data number of the thumbnail to be displayed during the fast display mode. In other words, the image data of the image data number "Ni" is to be displayed, and the corresponding text data 41*c* is displayed on the LCD 41.

Therefore, owing to the addition of the value of the "display thumbnail number S" to the value of the variable "Ni," for example, where the thumbnail string 41*b* whose image data numbers are "1" to "6" has been displayed in the last normal display mode screen, the image data of the image data number "7" which is the value obtained by adding the display thumbnail number "S" to the image data number "1," is determined as the image data to be displayed, and the corresponding text data 41*c* (see FIG. 3B) is displayed in the fast display mode screen on the LCD 41 next.

Subsequently, whether or not the variable "Ni" is at least the total number N of the accessible image data; that is, whether or not the maximum value of the image data numbers has been reached, is judged (S814). Where the judgment at step S814 is positive (S814: "Yes"), the variable "Ni" is set at "1" (S816). On the other hand, where the judgment at step S814 is negative (S814: "No"), the routine shifts to the processing of step S810 with step S816 skipped.

On the other hand, if the left scroll icon 52 has been subjected to the "long press" (S802: "left scroll icon"), the image data to be displayed is altered in the direction in which the image data numbers decrease. More specifically, the value of the variable "display thumbnail number S" is subtracted from the variable "Ni" (S804). Thus, for example, where the thumbnails of the image data numbers "7" to "12" are displayed in the normal display mode screen, the text data 41*c* of the image data numbers No. "1" is determined as the next text data to be displayed.

Subsequently, whether or not the value of the variable "head image data No. Ni" has become less than "1" is judged (S806). Where the judgment at step S806 is negative (S806: "No"), the routine shifts to step S810.

On the other hand, where the value of the variable "head image data number Ni" has become less than "1" (S806: "Yes"), the remainder obtained by dividing the total number N of the image data by the display thumbnail number S is denoted by "a." If a=0, the variable "Ni" is set at "N−S+1." On the other hand, when a≠0, the variable "Ni" is set at "N−a+1."

When the image data number "Ni" is determined in this way, "Fast" signifying the fast display mode is subsequently set as the value of the variable "display mode M" (S810). In addition, the routine returns to the processing of step S10 shown in FIG. 5, and the fast display mode process (S24) is executed. Thus, the display on the LCD 41 shifts from the normal display mode screen to the fast display mode screen, and the text data 41c of the image data number "Ni" is displayed on the LCD 41 in the subsequent processing.

Figure 9:
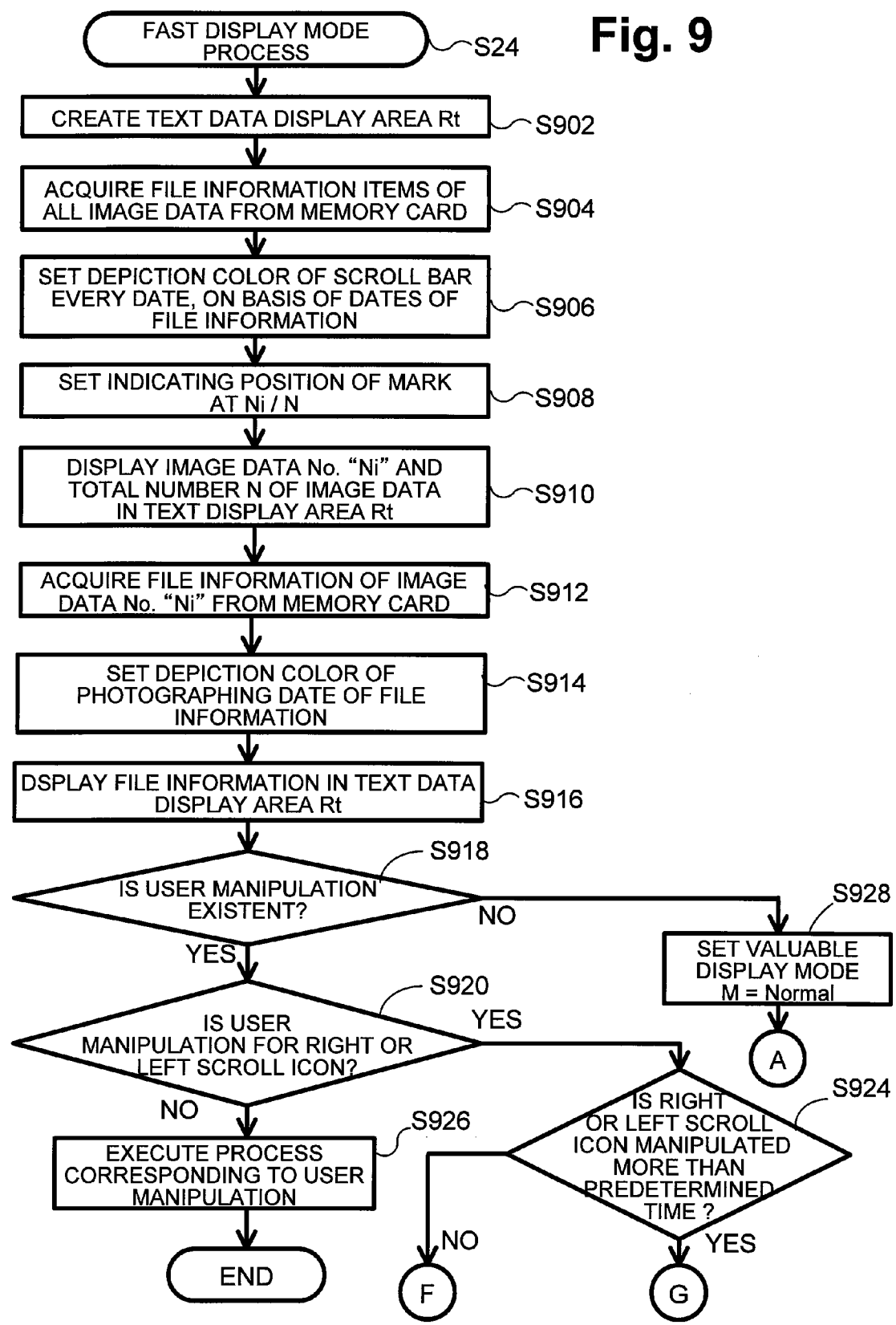
FIG. 9 is a flow chart showing a fast display mode process.
Figure 11A:
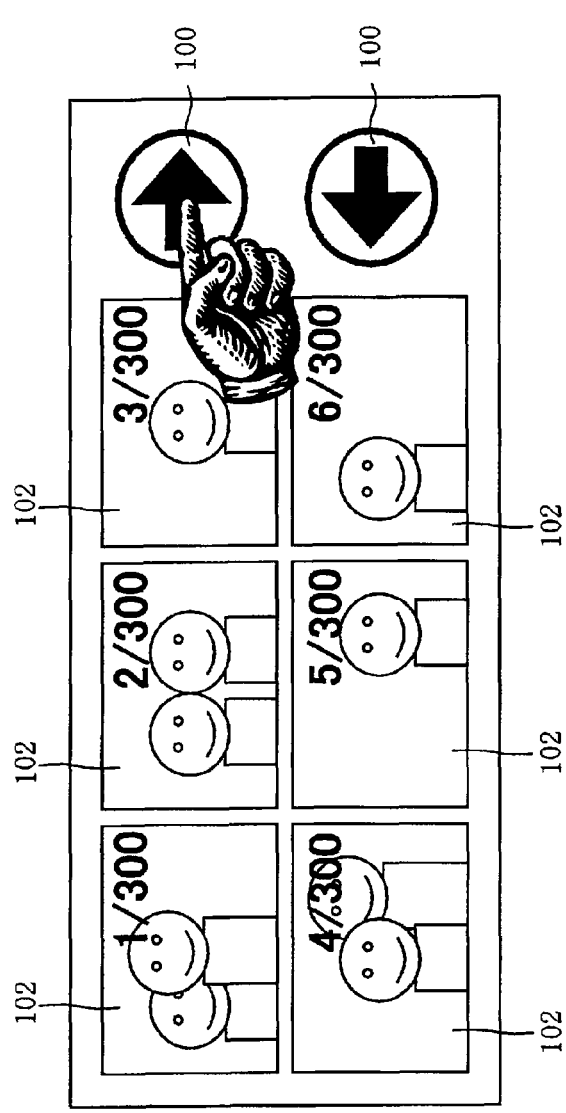
Figure 11B:
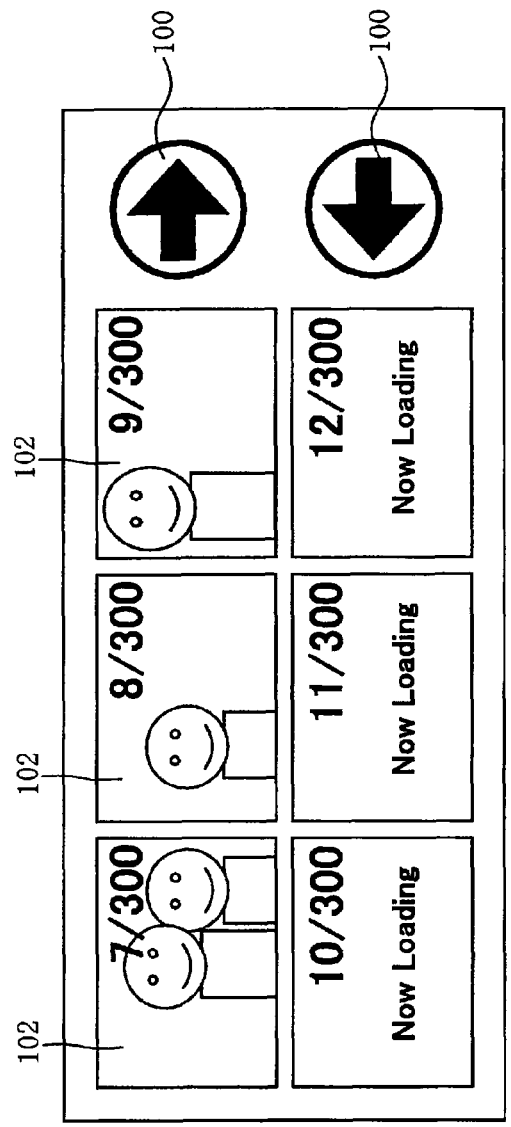
FIG. 11B shows a state where, after the display of the thumbnail display screen shown in FIG. 11A, an input to a scroll key has been made, so that thumbnails to be displayed have been switched.

The fast display mode process (S24) will be described with reference to FIG. 9. The fast display mode process (S24) is a process which displays the text data 41c of the image data number "Ni" on the LCD 41, and in which, while the "long press" of the right or left scroll icon 50 or 52 by the user continues, the image data corresponding to the text data 41c to be displayed is switched in the order of the image data numbers, and the switching continues.

First, a text data display area Rt is created for one image data file and is stored in the display area management memory 23d (see FIG. 2) (S902). Subsequently, the file information items of all the image data are acquired from the memory card 72a (S904).

In addition, the depiction color of the bar 41d1 (see FIG. 3B) of the scroll bar is set for every photographing date, on the basis of the photographing dates contained in the file information, and the scroll bar 41d is displayed (S906). Subsequently, the indicating position of the mark 41d2 (see FIG. 3B) is set at Ni/N. That is, the longitudinal direction of the bar 41d1 is equally divided by the total number N of the image data files, and a position corresponding to the image data number "Ni" is set as the indicating position (namely, display position) of the mark 41d2 (S908).

Subsequently, the display order information 41c2 (see FIG. 3B) which includes the image data number "Ni" and the total number N of the image data is displayed in the text display area Rt (S910). Subsequently, the file information 41c1 of the image data number "Ni" is acquired from the memory card 72a (S912).

Subsequently, the depiction color of the photographing date contained in the acquired file information 41c1 is determined. The depiction color determined here is a color corresponding to the depiction color set for every photographing date in the processing of step S906.

Subsequently, the file information 41c1 is displayed in the text display area Rt (S916). In addition, whether or not any user manipulation of the LCD 41 has been made is judged (S918). Where user manipulation is nonexistent (S918: "No"); that is, where the "long press" of the right or left scroll icon 50 or 52 has been ended, the routine advances to a step S928, at which the value "Normal" representing the normal display mode is set in the variable "display mode M" (S928), whereupon the routine returns to the processing of step S10 shown in FIG. 5. Thus, the display on the LCD 41 shifts from the fast display mode screen to the normal display mode screen. Further, the thumbnail string 41b displayed at the shift to the normal display mode screen is the thumbnail string wherein the thumbnail of the image data corresponding to the display of the text data 41c at the end of the "long press" of the right or left scroll icon 50 or 52 (that is, the thumbnail of the image data number "Ni") is the head thumbnail (refer to FIGS. 4A and 4B).

Accordingly, the user can guess whether or not the corresponding image data is the desired data, or whether or not the desired image data has been approached, from the text data in the fast display mode screen. Then, the user causes the LCD 41 to display the thumbnail of the guessed image data by ending the "long press" of the right or left scroll icon 50 or 52, and he/she can confirm the detailed contents with the thumbnail, so he/she can judge whether or not the guessed image data is the desired image data.

On the other hand, where user manipulation of the LCD 41 is existent (S918: "Yes"), whether or not the user manipulation has been made for the right or left scroll icon 50 or 52 is subsequently judged (S920). Where the judgment at step S920 is negative (S920: "No"), a process corresponding to the user manipulation is executed (S926), and the routine is ended.

On the other hand, where the judgment at step S920 is positive (S920: "Yes"), whether or not the manipulation for the right or left scroll icon 50 or 52 has continued for, at least, a predetermined time (that is, whether or not the "long press" of the right or left scroll icon 50 or 52 is continuing), is subsequently judged (S924). Where the judgment at step S924 is positive (S924: "Yes"), the routine shifts to the process for displaying the fast display mode screen as described with reference to FIG. 8.

On the other hand, where the judgment at step S924 is negative (S924: "No"), that is, where the user manipulation is the "short press" of the right or left scroll icon 50 or 52, the routine shifts to the process for switching the image data to-be-displayed as described with reference to FIG. 7.

Although the present disclosure has been described above in conjunction with a particular embodiment, the disclosure is not restricted to the foregoing embodiment, but various improvements and alterations are possible within a scope not departing from the disclosure.

By way of example, in the foregoing embodiment, the filename, the photographing date and the file size have been displayed as the file information 41c1 of the text data 41c in the fast display mode screen (refer to FIG. 3B). However, one or more of them can be displayed instead of all of them.

FIG. 10A is a diagram showing a fast display mode screen in a modified embodiment of the present disclosure. When text data 41c is formed to display, for example, only image data number, the total number of image data files and a photographing date as shown in FIG. 10A, the user can judge the contents of the text data on the image data number or the photographing date which is switched and displayed in a predetermined text display area, and he/she can rapidly find text data 41c1 effective for seeking the desired image data.

Alternatively, only the image data number and the total number of the image data files or only the photographing date can be displayed as the text data 41c1 in the fast display mode screen.

In the foregoing embodiment, only the text data has been displayed in the text display area of the fast display mode screen. In another embodiment, a thumbnail can be simultaneously displayed with the text data. FIG. 10B is a diagram showing a fast display mode screen in such a further embodiment. As shown in FIG. 10B, a thumbnail 41e representing image data to be displayed is simultaneously displayed in a text display area, so the user can more accurately judge whether or not the image data to be displayed is desired. The display of one thumbnail can be processed in a short time, and hence, the loss of speed for switching text data 41c to be displayed is small.

In the fast display mode screen of the foregoing embodiment, the photographing date includes a year, a month and a day; however, it can be formed to simultaneously display, for example, a day of the week. Also, a display color which differs every day of the week could be used for the display of the photographing date contained in the text data 41c.

In each of the embodiment and the modified embodiments described above, the text data 41c corresponding to one image data has been displayed on the LCD 41 in the fast display mode screen. Alternatively, text data 41c corresponding to a plurality of image data can be arrayed and displayed on one screen.

In the foregoing embodiment, the text data 41c is switched in a sequence in which every six image data numbers (in other words, every display thumbnail number S) are skipped. Alternatively, the text data 41e may be switched one by one in the order of the image data numbers, or it can be switched and displayed by skipping the image data numbers any desired number set by the user.

In the description of the foregoing embodiment, a process performed after the discovery of the desired image data by the user has been omitted. For example, the process can be so configured that, when the user selects any of the thumbnails 41a displayed on the normal display mode screen, the selected thumbnail 41a is displayed on an enlarged scale on the LCD 41. Alternatively, the process can be configured that, where the thumbnail 41a is selected by the user, the image data corresponding to the thumbnail 41a is printed or outputted from the multifunctional machine 1 to external equipment.

In the foregoing embodiment, the image data numbers are assigned by sorting file information items in the order of the photographing dates. However, this aspect is not restrictive, but image data numbers can be assigned in a sequence in which the file information items are sorted in accordance with another condition; for example, filenames, the update days and hours of the image data, or data sizes.

In the foregoing embodiment, the image data has been read out from the memory card 72a, and subjected to a reduction process to display the thumbnails 41a. However, where data for displaying the thumbnails has been previously added to the image data stored in the memory card 72a, the thumbnail displaying data can be read out from the memory card to display the thumbnails 41a.

In the foregoing embodiment, the bar 41d1 of the scroll bar has been divided by creation date, but it can be divided, for example, in accordance with the forenoon or afternoon of the photographing date, or with reference to the time of day of the photographing date.

In the foregoing embodiments, the touch screen/LCD display and scroll icons 50, 52 are described as a user input switch. However, those skilled in the art will understand that the user input switch can alternatively be embodied in one or more conventional separate button(s), rocker switch(es), or other switching devices.

The term "computer-readable medium" as used herein refers to any medium that participates in providing instructions to processor 21 for execution. Such a medium may take many forms, including but not limited to, non-volatile media, volatile media, and transmission media. Non-volatile media include, for example, optical or magnetic disks, such as memory card 72a. Volatile media include dynamic memory, such as RAM 23. Transmission media include coaxial cable, copper wire and fiber optics, including the wires that comprise bus 25. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of computer-readable media may be involved in carrying out one or more sequences of one or more instructions to CPU 21 for execution. For example, the instructions may initially be borne on a magnetic disk of a remote computer. The remote computer can load the instructions into its dynamic memory and send the instructions over a telephone line using a modem. A modem local to MFD 1 can receive the data on the telephone line and use an infrared transmitter to convert the data to an infrared signal. An infrared detector coupled to bus 25 can receive the data carried in the infrared signal and place the data on bus 25. Bus 25 carries the data to RAM 23, from which CPU 21 retrieves and executes the instructions. The instructions received by ROM 23 may optionally be stored on EEPROM either before or after execution by CPU.

The present disclosure can be practiced by employing conventional materials, methodology and equipment. Accordingly, the details of such materials, equipment and methodology are not set forth herein in detail. In the previous descriptions, numerous specific details are set forth. such as specific materials, structures, chemicals, processes, etc., in order to provide a thorough understanding of the present disclosure. However, as one having ordinary skill in the art would recognize, the present disclosure can be practiced without resorting to the details specifically set forth. In other instances, well known processing structures have not been described in detail, in order not to unnecessarily obscure the present disclosure.

Only exemplary embodiments of the disclosure and but a few examples of its versatility are shown and described herein. It is to be understood that the disclosure is capable of use in various other combinations and environments and is capable of changes or modifications within the scope of the inventive concepts as expressed herein.

What is claimed is:
1. A display apparatus comprising: a display panel:
   a user input switch for inputting a first switching instruction, and for inputting a second switching instruction from the user; and
   a processor configured to perform:
   a step of managing a display order of image data files and associated text data;
   a step of displaying a plurality of the image data files on the display panel;
   a step of selecting text data to be displayed, the text data corresponding to image data from a selected one of the image data files;
   a first shifting step of shifting the display of the plurality of the image data files to a display of the selected text data responsive to the first switching instruction;
   a second shifting step of, responsive to the second switching instruction, shifting the display of currently displayed text data to a simultaneous display of 1) an image corresponding to the displayed text data and 2) an image string representing a plurality of the image data files which follow the image corresponding to the displayed text data in the display order;
   a step of continuously and automatically switching the displayed text data in the display order during an interval from the first shifting step responsive to the first switching instruction to the second shifting step responsive to the second switching instruction.
2. The apparatus of claim 1, wherein the user input switch is for inputting the first switching instruction when the user operates the input switch continuously for at least a predetermined time period.

3. The apparatus of claim 2, wherein the user input switch is for inputting the second switching instruction when the user stops operating the user input switch.

4. The apparatus of claim 1, wherein the image data files and associated text data are stored in a memory device.

5. The apparatus of claim 4, wherein the memory device is detachable mountable from the display apparatus.

6. The apparatus of claim 1, wherein the display panel includes a touch panel comprising the user input switch.

7. The apparatus of claim 6, wherein the touch panel is for inputting the first switching instruction when the user touches the display panel continuously for at least a predetermined time period.

8. The apparatus of claim 7, wherein the touch panel is for inputting the second switching instruction when the user stops touching the display panel.

9. The apparatus of claim 2, wherein the processor is further configured to perform the step of switching the displayed image data string according to the display order when the user operates the input switch for a continuous time period less than the predetermined time period.

10. The apparatus of claim 1, wherein the processor is further configured to perform the step of displaying a scroll bar on the display panel simultaneously with the text data, the scroll bar comprising a bar and a mark at a position along the length of the bar; wherein the position corresponds to an image number of the displayed text data relative to a total number of image data files.

11. The apparatus of claim 10, wherein the display order corresponds to creation dates of the image data files, and the bar of the scroll bar visually differentiates each creation date of the image data files.

12. The apparatus of claim 1, wherein when the processor switches the displayed text data, it sequentially switches the text data skipping a predetermined number of image data files in the display order.

13. The apparatus of claim 1, wherein the processor is for simultaneously displaying image data from the selected image data file with the displayed text data.

14. A non-transitory computer-readable medium bearing instructions for controlling a display on a display panel, said instructions, when executed, being arranged to cause a processor to perform:
   a step of managing a display order of image data files and associated text data;
   a step of displaying a plurality of the image data files on the display panel a step of selecting text data to be displayed, the text data corresponding to image data from a selected one of the image data files;
   a first shifting step of shifting the display of the plurality of the image data files to a display of the selected text data responsive to the first switching instruction;
   a second shifting step of, responsive to a second switching instruction, shifting the display of currently displayed text data to a simultaneous display of 1) an image corresponding to the displayed text data and 2) an image string representing a plurality of the image data files which follow the image corresponding to the displayed text data order;
   a step of continuously and automatically switching the displayed text data in the display order during an interval from the first shifting step responsive to the first switching instruction to the second shifting step responsive to the second switching instruction.

15. The computer-readable medium of claim 14, wherein the user input switch is for inputting the first switching instruction when the user operates the input switch continuously for at least a predetermined time period;
   wherein said instructions, when executed, are arranged to cause the processor to perform the step of switching the displayed image data string according to the display order when the user operates the input switch for a continuous time period less than the predetermined time period.

16. The computer-readable medium of claim 14, wherein said instructions, when executed, are arranged to cause the processor to perform the step of displaying a scroll bar on the display panel simultaneously with the text data, the scroll bar comprising a bar and a mark at a position along the length of the bar; wherein the position corresponds to an image number of the displayed text data relative to a total number of image data files.

17. The computer-readable medium of claim 16, wherein the display order corresponds to creation dates of the image data files, and the bar of the scroll bar visually differentiates each creation date of the image data files.

18. The computer-readable medium of claim 14, wherein said instructions, when executed, are arranged to cause the processor to sequentially switch the text data skipping a predetermined number of image data files in the display order, when the processor switches the displayed text data.

19. The computer-readable medium of claim 14, wherein said instructions, when executed, are arranged to cause the processor to simultaneously display image data from the selected image data file with the displayed text data.

20. A display apparatus comprising:
   management means for managing a display order, on a screen, of image data files and associated text data stored in a storage means;
   image display means for displaying a plurality of the image data files on the screen;
   text data display means for selecting text data, the text data corresponding to image data from the image data files stored in the storage means, and for displaying the text data on the screen;
   input means for allowing a user to input a switch instruction for making a request for switching the text data;
   text data switching means for shifting the display of the plurality of the image data files displayed by the image display means to a display of the selected text data responsive to the switch instruction; and
   stop instruction judgment means for judging if a predetermined stop instruction has been inputted by the user, when the text data is being displayed by said text data display means;
   wherein the image display means is for shifting the display of the currently displayed text data by said text data display means to a display of an image representing the image data file, when the input of the stop instruction has been judged by said stop instruction judgment means;
   wherein said image display means selects a plurality of image data files corresponding to the text data displayed at the input of the stop instruction, and which follow in the display order, and said image display means displays an image string representing the plurality of image data files simultaneously with the image representing the image data file; and
   wherein the image display means is for continuously and automatically switching the displayed text data in the display order during an interval from the input of the switch instruction to the input of the stop instruction.

* * * * *